(12) United States Patent
Lane

(10) Patent No.: US 8,772,974 B2
(45) Date of Patent: Jul. 8, 2014

(54) WIRELESS TRANSMISSION OF ENERGY THROUGH CONCENTRIC LASER-INDUCED PLASMA CHANNELS IN ATMOSPHERE

(75) Inventor: Glenn E. Lane, Summerfield, FL (US)

(73) Assignee: Glenn Lane Family Limited Liability Limited Partnership, Summerfield, FL (US)

( * ) Notice: Subject to any disclaimer, the term of this patent is extended or adjusted under 35 U.S.C. 154(b) by 611 days.

(21) Appl. No.: 12/917,009

(22) Filed: Nov. 1, 2010

(65) Prior Publication Data

US 2011/0266891 A1 Nov. 3, 2011

Related U.S. Application Data

(60) Provisional application No. 61/280,129, filed on Oct. 31, 2009.

(51) Int. Cl.
*H01F 38/00* (2006.01)
*H04B 13/00* (2006.01)
*H02J 5/00* (2006.01)

(52) U.S. Cl.
CPC *H04B 13/00* (2013.01); *H02J 5/005* (2013.01)
USPC ........... 307/104; 307/149; 307/151; 361/230; 361/213; 219/130; 250/286

(58) Field of Classification Search
USPC .................. 307/104, 149, 151; 361/230, 213; 219/130; 250/286
See application file for complete search history.

(56) References Cited

U.S. PATENT DOCUMENTS

| | | |
|---|---|---|
| 3,719,829 A | 3/1973 | Vaill |
| 4,453,196 A * | 6/1984 | Herr ............................... 361/232 |
| 5,726,855 A | 3/1998 | Mourou et al. |
| 5,930,313 A | 7/1999 | Slinker et al. |
| 6,111,237 A * | 8/2000 | Paustian ......................... 219/687 |
| 6,377,436 B1 * | 4/2002 | Margolin ........................ 361/230 |
| 6,483,077 B1 | 11/2002 | Albright et al. |
| 6,955,324 B2 | 10/2005 | Tanielian |

FOREIGN PATENT DOCUMENTS

WO WO 2011053922 A1 * 5/2011

OTHER PUBLICATIONS

PCT, International Search Report PCT/US2010/054989, Dec. 27, 2010, ISA, pp. 1-5.*
Chin, S.L., et al., "Advances in Intense Femtosecond Laser Filamentation in Air," Laser Physics, 2012, vol. 22, No. 1, pp. 1-53.

* cited by examiner

*Primary Examiner* — Jared Fureman
*Assistant Examiner* — Alfonso Perez Borroto
(74) *Attorney, Agent, or Firm* — Saliwanchik, Lloyd & Eisenschenk

(57) ABSTRACT

A method and apparatus for transmission of charged particles along a laser-induced conduction path of concentric plasma channels in atmosphere. The apparatus comprises a high power laser array in operable communication with a high energy output means to accomplish initiation of at least two concentric plasma channels in atmosphere, a second energy source for outputting the charged particles to be transmitted, and means for introducing the charged particles to be transmitted into the wall of at least one of the laser-induced conduction channels. Other embodiments further include means for inducing the energy across the conduction path to a target capable of receiving and storing the energy, and a plurality of charging rods bearing a negative or positive charge and in communication with each conductive channel for shaping and stabilizing the charge transmitted therethrough.

22 Claims, 10 Drawing Sheets

WIRELESS TRANSMISSION OF ENERGY THROUGH CONCENTRIC LASER-INDUCED PLASMA CHANNELS IN ATMOSPHERE

RELATED APPLICATION

This application claims the benefit of U.S. Provisional Application No. 61/280,129, filed Oct. 31, 2009 and entitled, Systems, Methods and Apparatus for Wireless Transmission of Energy Through Concentric Laser-Induced Plasma Channels in Atmosphere.

FIELD OF THE INVENTION

The present invention relates to the transmission of energy through concentric laser-induced plasma channels in atmosphere.

BACKGROUND OF THE INVENTION

It has been a longstanding goal of physicists to develop a means of large scale wireless power transmission through the air along a controlled path. The operative word in this goal is "controlled", an element which until now has eluded researchers.

It is recognized that a laser beam of suitable wavelength and energy can penetrate through a gas medium over great distances (i.e., in the kilometric range) and will establish a partially ionized trail therethrough which is straight. Pulsed lasers are now available in the Megawatt class and can deliver pulses on the order of femtoseconds ($10^{-15}$ seconds); that is one quadrillionth, or one millionth of one billionth of a second. For context, a femtosecond is to a second, what a second is to about 31.7 million years.

When generating a plasma channel, each pulse of the laser bombards the atmosphere with a measured amount of photonic energy. When this energy is increase to a certain level, electrons in the atmosphere become disassociated from their atoms, creating an ionized plasma state. Between laser pulses, the electrons begin to return back to their atoms. The integrity of the field is maintained as long as the pulsing frequency of the laser is faster than the relaxation rate of the ionized plasma. Due to the Kerr-lens effect, once the refractive index has been modified, the plasma field has a self focusing effect on the laser beam. This effect reduces the amount of laser power required to maintain the plasmas field.

Unfortunately, current-carrying plasma channels tend to self constrict due to magnetic forces stemming from the current flowing through the plasma. This phenomenon results is known as the "plasma pinch" or "electron spin magnetic pinch". Upon closing of the plasma channel as a result of the pinch, the current will then follow the path of least resistance to ground which is by its nature unpredictable and dangerous. Clearly, there is a need in the art for a means of obviating and/or compensating for the above adverse phenomena to provide for the bulk transmission of power in a more safe and controlled fashion.

The provision of a method and apparatus for controlled wireless power transfer in atmosphere would have many scientific and industrial applications. For example, a controlled atmospheric conduction path could be used to safely and repetitively control the discharge of lightning strikes before natural breakdown occurs to protect power plants, airports, launch sites, etc. Militarily, such paths can be used to send a current pulse to a distant object (for example, to destroy a target or to disable a target's electronics). Such paths can also find application in the harvesting of energy from the upper atmosphere as described more fully in applicant's co-pending U.S. Patent Application entitled, Charged Particle Induction From Ionosphere to Ground, filed contemporaneously with the instant application and incorporated herein in its entirety by reference. Still further, such a means of power transfer finds application in the bulk power transmission industry itself which is the context in which the subject invention is described herein.

Electric power transmission is the bulk transfer of electrical power (or more correctly energy). A power transmission network typically connects power plants to multiple substations near a populated area. Electric power transmission allows distant energy sources (such as hydroelectric power plants) to be connected to consumers in population centers, and may allow exploitation of low-grade fuel resources such as coal that would otherwise be too costly to transport to generating facilities.

A power transmission network is referred to as a "grid". Multiple redundant lines between points on the network are provided so that power can be routed from any power plant to any load center, through a variety of routes, based on the economics of the transmission path and the cost of power. Much analysis is done by transmission companies to determine the maximum reliable capacity of each line, which, due to system stability considerations, may be less than the physical or thermal limit of the line.

Usually transmission lines use three phase alternating current (AC), however, high-voltage direct current systems are used for long distance transmission, or some undersea cables, or for connecting two different ac networks. Electricity is transmitted at high voltages (110 kV or above) to reduce the energy lost in transmission.

High voltage direct current (HVDC) is used to transmit large amounts of power over long distances or for interconnections between asynchronous grids. When electrical energy is required to be transmitted over very long distances, it is more economical to transmit using direct current instead of alternating current. Nonetheless, high-voltage direct current lines are also restricted by thermal limits and voltage drops due to resistance.

Based on the above, it is clear that there is a need in the art to reduce reliance on wire-based energy transmission. It is also clear that in order for wireless-based energy transmission to be a viable solution it is critical that the conductive path be stabilized during energy transmission therethrough and that there be provided a means for capturing an errant charge in the event the channel though which it is traveling closes. The methods and apparatus described herein are directed to meeting these important objectives.

SUMMARY OF THE INVENTION

The subject invention relates to methods and apparatus for the wireless transmission of energy along ionized conductive paths (i.e. of plasma) in a gas media such as the atmosphere where the length of the path is practically suited (i.e., on the order of kilometers) for electric power transmission from a power source to a remote target such as a power grid or other receiving station. Rather than providing a single conductive pathway over which a charge is carried, the subject transmission path is comprised of at least two concentric plasma channels ("con-channels"). As used herein, the term "channel" means an elongated, substantially cylindrical or frustum-shaped conductive plasma wall, substantially ring-like in cross-section, the wall being normally insulated on both sides by atmosphere and serving as the conductive path through which energy travels.

Thus, according to one aspect of the present invention there is provided a laser-induced or "laser-augured" conduction path of concentric plasma channels in atmosphere along which electrical energy may be transmitted in pulsed or preferably constant fashion. More specifically, the subject apparatus comprises at least one high power, ultra-fast (i.e., femtosecond) pulsed, "Kerr", non-linear laser in operable communication with a high energy output means to accomplish initiation of at least two, and preferably at least three ionizing beams which, when caused to rotate via various mechanical and/or optical means, produce corresponding concentric plasma channels, and means for introducing a flow of charged particles into at least one channel for transmission to a target such as a receiving station adapted to receive and store the energy transmitted. Each concentric channel has an essentially ring-shaped cross section, serves as a separate conductive pathway, and is continuously regenerated during operation thereby stabilizing the conductive path as a whole from point to point, and allowing for continuous flow of charge, atmospheric conditions permitting. The path need only remain open for relatively short intervals to transmit high orders of energy, however, the present invention provides for sustained transmissions as well.

The provision of at least two separate, but proximally located con-channels for energy transmission not only provides redundancy, but meets the need in the art for added safety. In the event that a current-carrying channel should close as a result of plasma pinch or other influences, a neighboring concentric plasma channel ("con-channel") will be the closest path of least resistance "found" by the errant charge seeking ground, thus avoiding unintended strikes to objects, structures or people in the field of operation. At least one neighboring con-channel is open at all times as described more fully herein.

According to one aspect of the invention, therefore, there is provided an apparatus for the wireless transmission of energy through the atmosphere, comprising:
  a. a first pulsed ionizing beam emitting means for producing a first pulsed ionizing beam through the atmosphere;
  b. a second pulsed ionizing beam emitting means for producing a second pulsed ionizing beam through the atmosphere;
  c. means for rotating said first pulsed ionizing beam to form a first conductive channel comprised of a wall of partially ionized atmosphere; said first conductive channel having a substantially ring-shaped cross section; said ring having a diameter;
  d. means for rotating said second pulsed ionizing beam to form a second conductive channel comprised of a wall of partially ionized atmosphere; said second conductive channel having a substantially ring-shaped cross section; said ring having a diameter greater than said diameter of said first conductive channel; said first conductive channel and said second conductive channel being concentric and being separated by a distance therebetween;
  e. an energy source capable of outputting a flow of electrically charged particles; and
  f. means for introducing said flow of electrically charged particles into said wall of either said first conductive channel, said second conductive channel, or both;
whereby said walls of said first conductive channel and said second conductive channel provide concentric pathways for the transmission of said electrically charged particles.

In another embodiment, the subject apparatus for wireless energy transmission further includes a "Debye charging system" comprised of a plurality of charging rods situate both interiorly and exteriorly of each plasma channel, means for moving the rods across each con-channel, a control system, magnetic field feedback sensors and a power source, all electrically connected. The charging rods can carry a negative or a positive charge. When operated in accordance with the method of the subject invention, the Debye charging system permits "shaping" of the charge being transmitted and optimizing stabilization of the current-carrying channel within the variables associated with Debye radius calculations.

Alternate embodiments of the subject apparatus are adapted for both sending and receiving high order energy. A plurality of the subject apparatus may be arranged in point-to-point fashion with the distances between points (i.e., between sending and receiving stations) being of kilometric order to create a "pipeline" connecting a power source to a remote target, such as a remote receiving station adapted for energy collection and storage, or an existing power grid. Additionally, a plurality of the subject apparatus may be arranged so as to create a wireless energy transmission grid.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
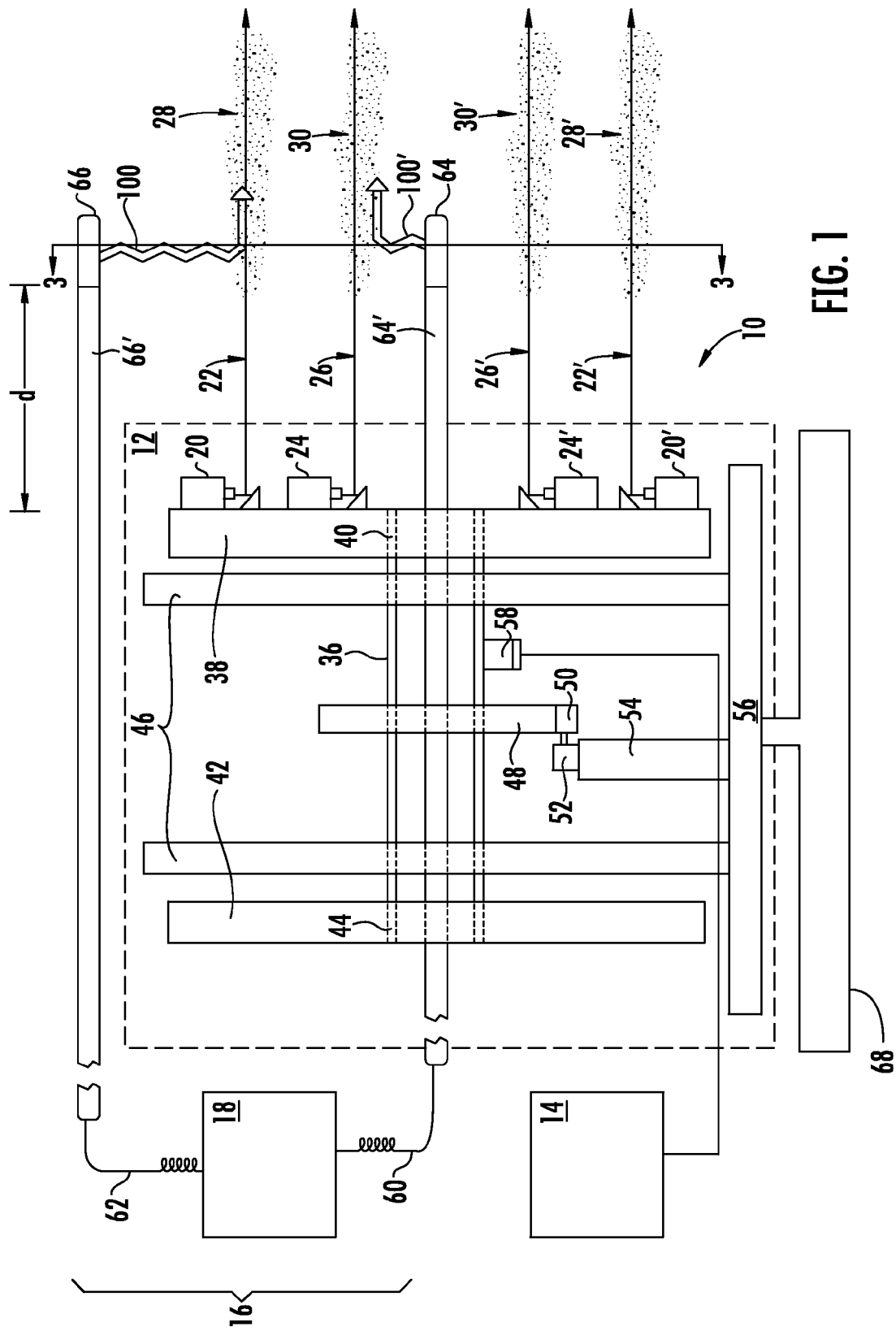
FIG. 1 is a schematic diagram of a first embodiment of the subject apparatus for wireless transmission of energy through concentric laser-induced plasma channels in atmosphere.

At the outset it should be appreciated that each embodiment of the subject apparatus will include at least two, and preferably at least three, concentric plasma channels. Reference is now made to FIG. 1 in which there is illustrated a first embodiment of an energy transmission apparatus of the subject invention designated generally by reference numeral 10. Apparatus 10 is comprised of two primary sub-systems each being operably connected to an energy supply source, namely: 1) wireless conductive channel producing means 12 which is connected to and powered by first energy source 14, and 2) charge introduction means 16 which is connected to a second energy source 18 capable of providing the electrical energy to be transmitted.

Wireless conductive channel producing means 12 (hereinafter "plasma channel producing means") is comprised of first ionizing beam emitting means 20 which emits first ionizing beam 22, second ionizing beam emitting means 24 which emits second ionizing beam 26, and means for moving first and second ionizing beams to form channels as herein described.

The term "ionizing beam emitting means" as used herein includes not only presently known lasers, but also other light sources which will excite ionization in a medium. Lasers utilize the natural oscillations of atoms or molecules between energy levels for generating a beam of highly amplified and coherent electromagnetic radiation of one or more discrete frequencies. The laser means used to establish conductive paths 28,28',30,30' should be selected with regard to energy, pulsewidth and wavelength so that it provides control of ionization concentration in each plasma channel. In a gas medium it is important that the ionizing beams 22,22',26,26' are controlled for optimum transmission of a charge.

Technologies that facilitate the creation of the subject con-channels include recent advancements in ultra-high intensity pulsed lasers and their transmission optics which together can generate a plasma field and have precise control over the field's geometry. Information regarding the manipulation and transmission of high powered lasers is generally classified due to the nature of their application. It is well known however, that successful high power laser systems are currently in operation, and it follows that the condition and control optics are in place to handle such a system. According to an embodiment described herein, this technology is adapted to generate the con-channels. Ultra-high power pulsed or continuous lasers are now available in the Megawatt class, such as the Airborne Laser (ABL) built by Northrop Grumman. The lasers employed by the subject apparatus and methods should also by capable of varying the chirp of the input pulse to achieve control of the filamentation over horizontal kilometric distances. By way of example, one embodiment may include a Ti:sapphire CPA (Chirp Pulse Amplification) laser system operating at 10 Hz and delivering a maximum output power of 0.2 TW per pulse. The pulse duration approximates 130-135 fs (FWHM). The beam may be truncated by a circular aperture having a desired radius in order to have a more stable beam shape with a perfect or near-perfect circular symmetry.

Figure 2:
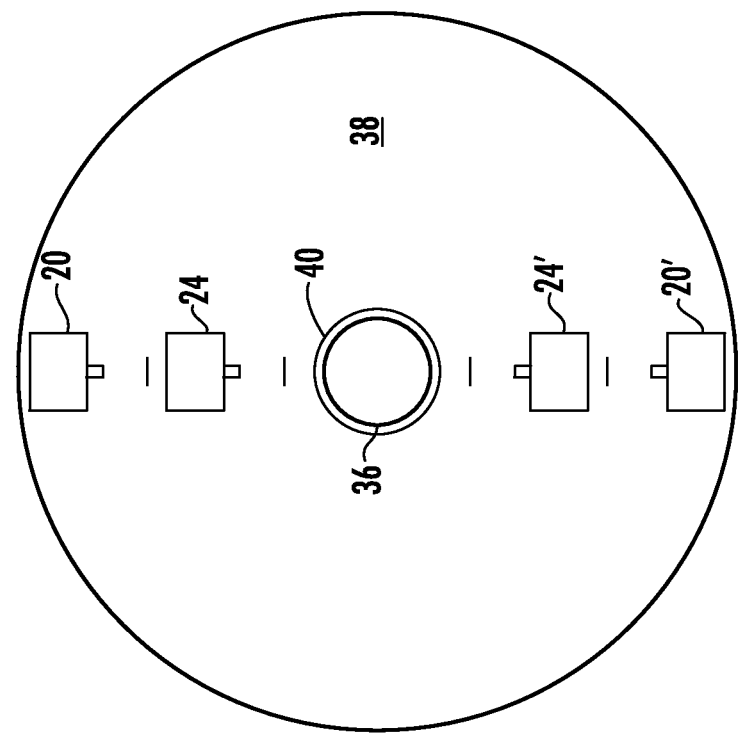
FIG. 2 is frontal view of the ionizing beam emitting means of FIG. 1 mounted to a conductive disc.

With additional reference to FIG. 2, in this two-channel embodiment, first and second ionizing beam emitting means 20,24 are each comprised of at least one laser (or possibly a laser diode) that emits first and second ionizing beams 22,26 ("laser beams"), respectively, into the air. Beams 22,26 cause blooming of the components of the atmosphere resulting in the formation of two electrically conductive paths of plasma 28,30, respectively, as represented by the shaded areas along each ray. It should be appreciated that in addition to lasers, other light sources of high steradiancy which will excite ionization in a gas medium may be employed.

As previously stated, the term "channel" means an elongated, substantially cylindrical or frustum-shaped conductive plasma wall, substantially ring-shaped in cross-section, the wall being created by the movement (i.e., rotation) of first and second conductive paths 28,30, respectively, about a common axis; the plasma wall being normally insulated on both sides (interiorly and exteriorly) by the atmosphere or other gas medium and serving as the conductive path through which energy travels.

Figure 3:
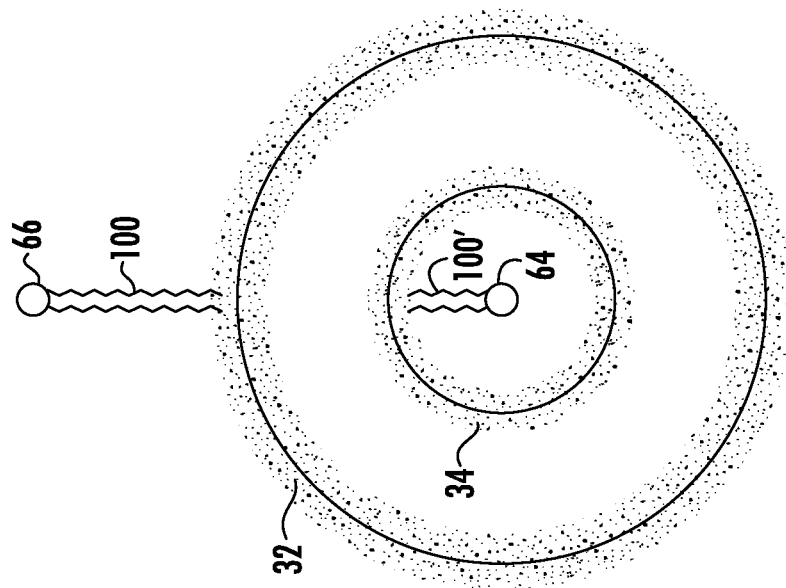
FIG. 3 is a cross-sectional view of the invention of FIG. 1 taken along line 3-3.

With continued reference to the two-channel embodiment of the subject invention generally, and to FIG. 3 in particular, first plasma channel 32 and second plasma channel 34 are preferably but not essentially circular in cross-section and share a common central longitudinal axis; they are concentric channels (or co-axial from a three-dimensional linear perspective). U.S. Pat. No. 6,377,436 issued to Margolin on Apr. 23, 2002 and entitled, Microwave Transmission Using a Laser-Generated Plasma Beam Waveguide, which said reference is incorporated herein in its entirety to the extent it is not inconsistent with the explicit teachings of this specification, teaches various directed energy beam systems in the form of channels or "shells". Although the Margolin shells are used as a guide through the interior of which microwaves are transmitted rather than high order energy through the "wall" of the shell (channel) itself, the means by which the shells are created are instructive and find utility in various embodiments of the subject invention.

With continued reference to FIGS. 1 and 2, therefore, an example of a simple Margolin-based mechanical means for moving (rotating) first and second ionizing beams 22,26 to form corresponding first and second concentric plasma channels 32,34. Additional ionizing beams and corresponding means for moving the same to form corresponding concentric plasma channels may be added. The mechanical means is comprised of conducting tube 36 in electrically conductive communication with a first electrically conductive disc 38 to which first and second (or additional) ionizing beam emitting means 20,24 are mounted. In the alternative, each ionizing beam emitting means may be mounted to a separate disc or mounting ring (not shown) capable of independent rotation selectively in a clockwise or counterclockwise direction. Disc 38 has a centrally disposed aperture 40 through which a first end of tube 36 is mounted. A counterweight 42 with centrally disposed aperture 44 is mounted to the opposite end of tube 36 to provide dynamic balancing.

In the embodiment illustrated, third and fourth ionizing beam emitting means 20',24' are mounted to the same surface of disc 38 opposite first and second ionizing beam emitting means 20,24, respectively. First and third ionizing beam emitting means 20,20' are precisely aligned so that only a single conductive plasma channel 32 is formed upon rotation of disc 38. Second and fourth ionizing beam emitting means 24,24 are similarly aligned to produce second plasma channel 34. As taught by Margolin, the reason for using opposing laser systems is to dynamically balance disc 38 and to reduce the speed at which the system must rotate. Alternately, one laser system can be replaced by the appropriate balancing weights. As a further alternative, more than two laser systems may be used as long as they are spaced appropriately in order to preserve the dynamic balance of the entire laser assembly. In all cases where more than one laser system is used to create a single plasma channel, they must be evenly distributed and precisely aligned so that only a single conductive shell is produced. Each ionizing beam emitting means may further include means for allowing independent movement of its corresponding ionizing beam in a multiple directions in order to focus and reshape its corresponding plasma channel. Each individual ionizing beam is manipulated for the duration of the charge transfer to maintain a conductive path. Plasma pinch and continuous regeneration of the "eye wall" (conductive path) are managed by electromagnetic field readings and computerized control device not covered in the present application.

Conducting tube 36 is mounted on bearing mount 46 to allow disc 38 and the components attached thereto to rotate. Ring gear 48 is mounted around the circumference of conducting tube 36 and engages gear 50 which is turned by motor 52 which in turn is supported by motor stand 54. A base 56 supports both motor stand 54 and bearing mount 46. As should be readily understood, rotation of conducting tube 36 causes rotation of each ionizing beam and corresponding conductive path to generate the desired sleeve-like plasma channels along which energy will be transmitted in the manner described herein below.

Power to all ionizing beam emitting means 20,20'24,24' is supplied by first energy source 14 through slip ring assembly 58 in a manner well known in the art. The voltage required is related to and increases with the length of the path to be ionized. The energy in Joules required to excite the gas molecules in the path into ionization can be calculated in advance knowing the density of the molecules and the approximate diameter and length of the conductive path over which the energy from second energy source 18 is to be transmitted. By way of example, and not intending to be limiting, first energy source 14 may be comprised of a Marx generator which is capable of generating a high-voltage pulse. Voltages produced may exceed 2 million volts.

It should be appreciated that in addition to the example mechanical means of creating plasma channels 32,34, it is also contemplated that other rotating ionizing beam emitting means may be employed including but not limited to optical systems which are used to move the beam(s), or a combination of both. Especially in embodiments where optical systems are employed to direct each ionizing beam, the ionizing beam emitting means may be located remotely relative to the optical system.

Having described a first embodiment of a wireless conductive channel producing means 12, we turn to the remaining components of this first embodiment, namely second energy source 18 which, as already apparent, is the source of electrical energy to be transmitted to a remote target along the wireless conductive path, as well as the means for introducing said energy into the path. Regarding the former, second energy source 18 may be any source of electrical energy or charge intended to be transmitted via the subject apparatus. For example, second energy source 18 could be an existing power grid from which power is to be "tapped" for transmission to a remote location, or second energy source 18 could be a means of generating high voltage locally for transfer to remote location. By way of example only, second energy source 18 could be a transformer or Cockcroft-Walton ("CW", not to be confused with the acronym for "Continuous Wave") generator or "multiplier", which is basically a voltage multiplier that converts AC or pulsing DC electrical power from a low voltage level to a higher DC voltage level. A Marx generator, which has a similar circuit with the same "ladder" structure but consists of resistors, capacitors and spark-gaps, may also be employed. The Marx generator produces short pulses, whereas the CW generator produces a constant DC.

With regard to the means for introducing the energy or "charge" to be transmitted through the wireless conductive path, in the simplest sense all that is required is that one end of each con-channel be in electrical contract with second power source 18 and the opposite end of each con-channel be in electrical contact with a target which acts as a ground. The potential between electrical source 18 and the target will result in the flow of charge (current) through the con-channels. For example, a single electrode such as electrode 64 situate within the interior of the wall of first and second conductive paths 28,30 or electrode 66 situate outside the wall of either the first or second conductive paths 28,30 is in electrical contact with second energy source 18 on one end (such as through output leads 60 and 62, respectively), and in electrical contact with either first or second conductive path 28,30 on the other end. Once these connections are made, energy will instantly flow from power source to target subject to the stability of the charge. Accordingly, an important feature of the subject invention is the provision of a strong induced grounding at the target, provided that there is a strong ground and polycentric conductive channels at least one of which carries a charge which does not collapse under the magnetic flow of electron spin. Premature grounding is prevented through the combined effect of a strong ground and negative resistance point-to-point. There must also be enough non-ionized atmosphere between the transmission channel and the Earth to provide insulation. The laser auger channel must be the path of least resistance from the point of transmission to the designated ground at the target.

Figure 5:
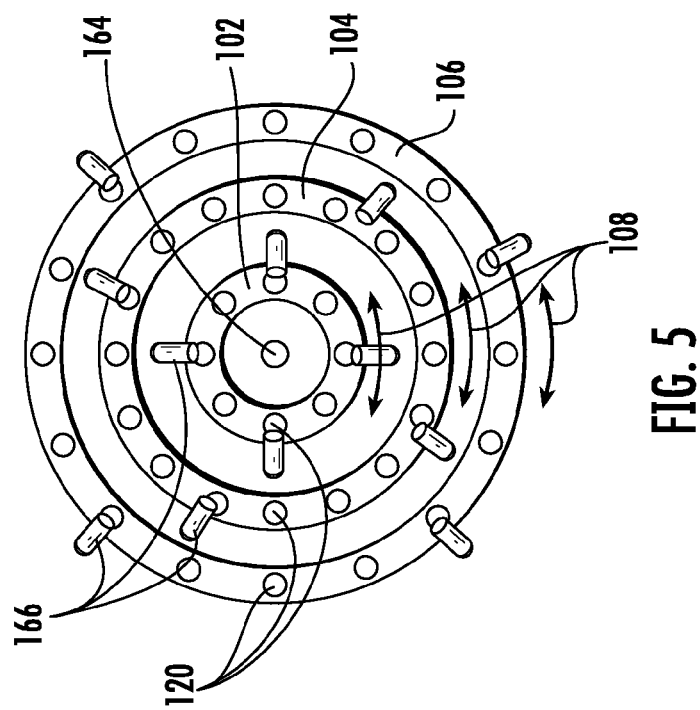
FIG. 5 is a frontal illustration of wireless conductive channel producing means of a three-channel embodiment of the subject apparatus for wireless transmission of energy.

In a second embodiment, power to be transmitted may be transmitted across two electrodes (i.e. electrodes 64 and 66) and the current moved into contact with either con-channel upon which the electrical energy will instantly flow from power source to target. Accordingly, charge introduction means 16 can be any device that creates an electric current 100 between two electrodes. Second energy source 18 has a large potential difference between its output leads 60,62 which are connected respectively to the electrodes 64,66 each of which includes heavily insulated portion 64',66' to prevent undesired arcing between an electrode and neighboring components of apparatus 10. Electrodes 64,66 are preferably but not essentially made of carbon or graphite. The insulated portion 64' of electrode 64 is disposed through tube 36 projecting outwardly therefrom a distance d from conductive disc 38 sufficient to prevent current 100 from coming into contact with other components of apparatus 10. The insulated portion of all other electrodes, namely electrode 66 in the instant embodiment, will extend the same distance d beyond conductive disc 38 which said distance is at least equal to the distance between ionizing beam emitting means 20,20'24,24' and the beginning of corresponding conductive paths 28,28', 30,30' along corresponding ionizing beams 22,22', 26,26'. Thusly extended, it is assured that the conducting portion of electrodes is proximate ionized gas which is critical to proper functioning of the apparatus. Note that electrode 64 is situate inside all concentric plasma channels 32,34 whereas all other electrodes 66 are situate outside of all concentric plasma channels, but movable in a variety of directions including into the adjacent channel. Depending on the polarity of the electrodes relative to one another, a current 100 may move from outer electrode 66 to inner electrode 64 or a current 100' may move from inner electrode 64 to an outer electrode 66. Additional outer electrodes spaced around and between the concentric plasma channels are contemplated as shown in FIG. 5, for example.

Electrodes 64,66 are preferably but not essentially round in section, and typically in segments with threaded couplings, so that as the electrodes wear, new segments can be added. The electrodes are automatically extended and retracted by a positioning system (not shown), which may use either electric winch hoists, hydraulic cylinders or other means. Electrodes situate outside of disc 38 are capable of multi-directional movement including in directions closer to or further from electrode 64 using the same positioning system. They may be designed to articulate for this purpose. In another embodiment, mast arms holding the electrodes carry heavy busbars, which may be water-cooled copper pipes carrying current to the electrode holders. The whole arm may carry the current, increasing efficiency. These can be made from copper-clad steel or aluminum. Since the electrodes move in and out, heavy water-cooled cables connect the bus tubes/arms with second energy source 18 located adjacent to conductive channel producing means 12 or alternatively remote therefrom. Heat transmitted through the electrodes and water-cooled cables may be converted to steam and utilized by steam turbine generators to maximize energy recovery.

In operation, all ionizing beam emitting means as well as second energy source 18 are controlled by a suitable control circuit (not shown) so as to cause the second energy source to apply its voltage to an electrode 64 or 66 when in contact with a con-channel, or alternatively between electrodes 64,66 at a time when at least one plasma channel 32,34 is present and passing between those electrodes. Referring to FIGS. 1 and 3, a current 100 of charged particles is emitted from electrode 66 in the direction of electrode 64 but before reaching electrode 64 comes into contact with first plasma channel 32 which diverts the energy to flow therethrough. Although shown as a ray in FIG. 1 it should be understood that channel 28 is tubular in shape. If first plasma channel 32 were not active at the time energy is emitted from electrode 66 it would be intercepted by the next available concentric plasma channel, in this case second plasma channel 34. Depending on the polarity of the electrodes (or their potential difference), energy from second energy source 18 may be emitted from centrally disposed electrode 64 in the direction of electrode 66 in which case current 100' would first come into contact with second plasma channel 34 and be diverted there along. If second plasma channel 34 was not active at the time energy is emitted from electrode 66 it would be intercepted by the next available concentric plasma channel, in this case first plasma channel 32 and travel there along.

Each ionized beam is created by operating ionizing beam emitting means or its power source in pulsed fashion using a controller electrically connected to one or both components. The controller will comprise a trigger, suitable for firing each ionizing beam emitting means and/or its power source, and also for controlling the rate at which one or both repeat their outputs. Pulsed systems have the advantage of providing quiescent intervals between their output pulses. A pulse system is beneficial since it is straight, highly defined and concentrated. The controller also keeps at least one channel open at any point in time thereby assuring that the energy to be transmitted always has a pre-defined conductive path to travel upon to the target. For instance, while plasma channel 32 is pinched, the control circuit assures that plasma channel 34 is active/open. As previously stated, the periodic discharges from the at least two ionizing beam emitting means can be synchronized to produce, in the aggregate, a constant directional plasma channel to a target 200.

Figure 4:
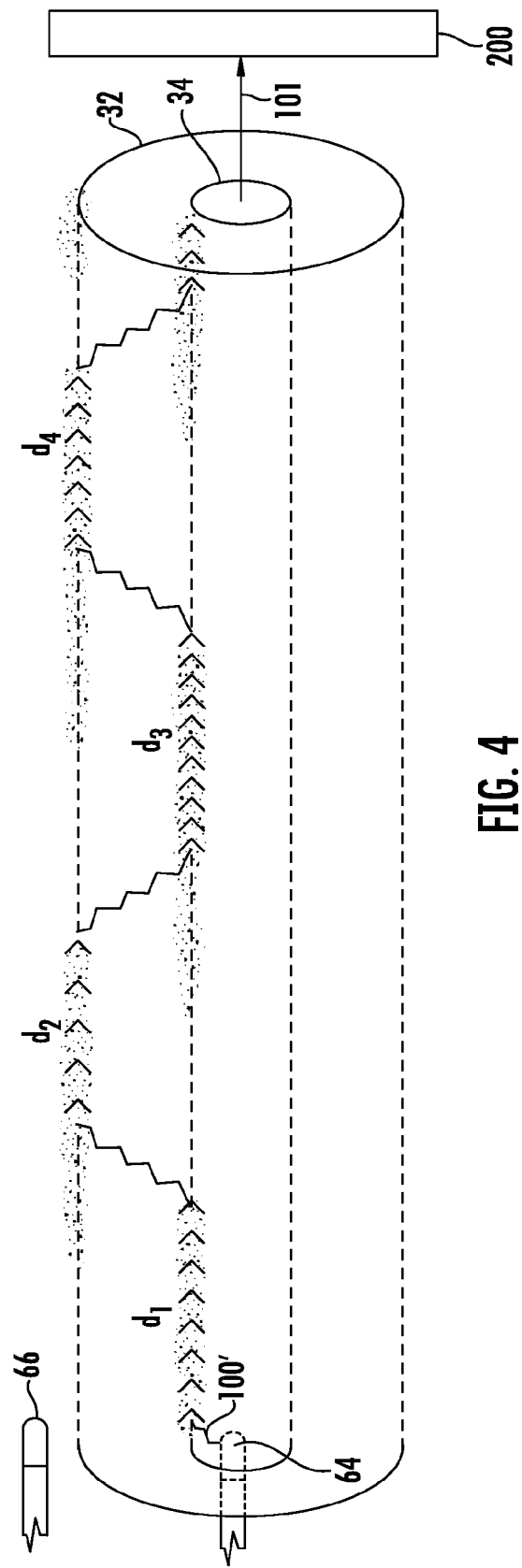
FIG. 4 is a perspective illustration of energy being transmitted along concentric plasma channels of the subject invention.

FIG. 4 is a conceptual illustration of the manner in which energy is transmitted from its point of origin, namely from electrodes 64,66 to a remote target 200. First and second plasma channels 32,34 comprise a plasma which is highly conductive and which is progressing longitudinally along directional arrow 101. Prior to the introduction of the energy to be transmitted into plasma channels 32,34, the channels remain fairly well defined for a usable interval of time. However, when the energy to be transmitted is introduced into and travels along a given plasma channel, the charge will eventually begin to self constrict due to magnetic forces stemming from the current flowing through the plasma causing the charge to close upon itself and leaving the energy being transmitted with no clear path to follow, potentially striking unintended targets.

The employment of at least two, and preferably at least three, concentric plasma channels in accordance with the subject invention mitigates such occurrences by providing adjacent conductive paths to which energy from second energy source 18 can "jump" when losing its point-to-point direction. After the charge transitions to its new conductive path, the last-travelled path is regenerated by its corresponding ionization beam emitting means. The subject apparatus and methods, therefore, provide that at least one conductive path is always open and in close proximity to a neighboring current-carrying plasma channel.

In the example illustrated in FIG. 4, current 100' traveling from centrally disposed first electrode 64 to second electrode 66 comes into contact with second plasma channel 34 and begins to travel there along a first time interval or distance $d_1$ until the charge self-constricts and seeks out a new path of least resistance, in this case neighboring first plasma channel 32 onto which the energy will "jump" and then travel a second time interval or distance $d_2$. As energy traverses second distance $d_2$ second plasma channel 34 is regenerated serving as the next adjacent "jump site" onto which the charge may wander. Energy will jump to second plasma channel 34 and travel there along a third time interval or distance $d_3$ until the charge self-constricts at which point it jumps to another con-channel. Energy will travel in channel-to-channel fashion from its point of origin to its target 200. It is possible, of course, that in certain circumstances a current will follow a single path to the target, particularly if the charge can be stabilized using the Debye charging system described infra. What is important here is that there is always a predefined alternate directional conductive path for the energy to travel if its current path becomes constricted or less-conductive.

Figure 6:
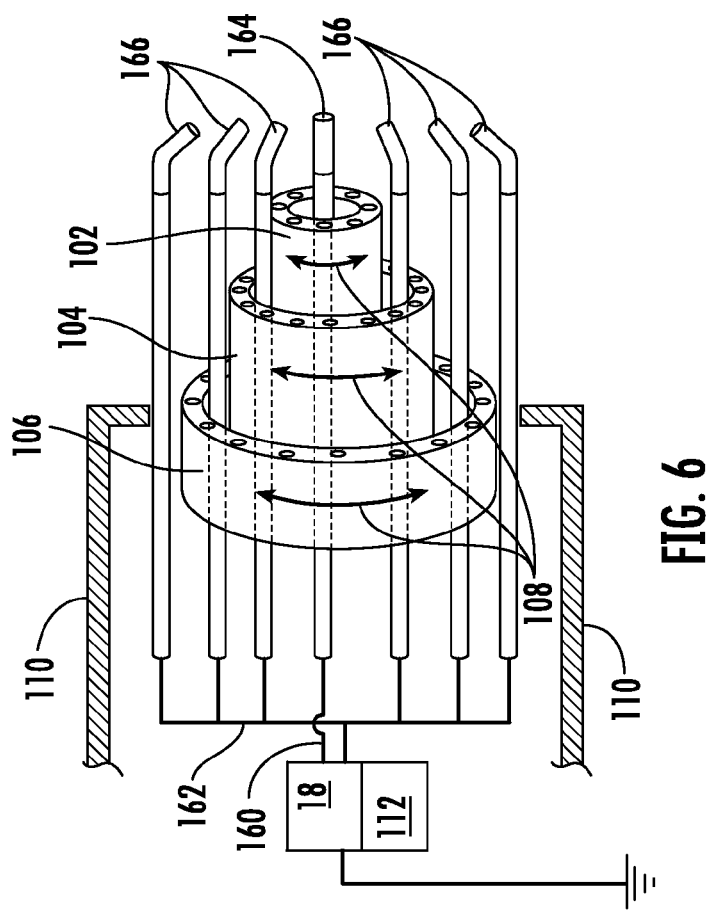
FIG. 6 is a perspective illustration of the wireless conductive channel producing means of FIG. 5 shown in a extended position.
Figure 7:
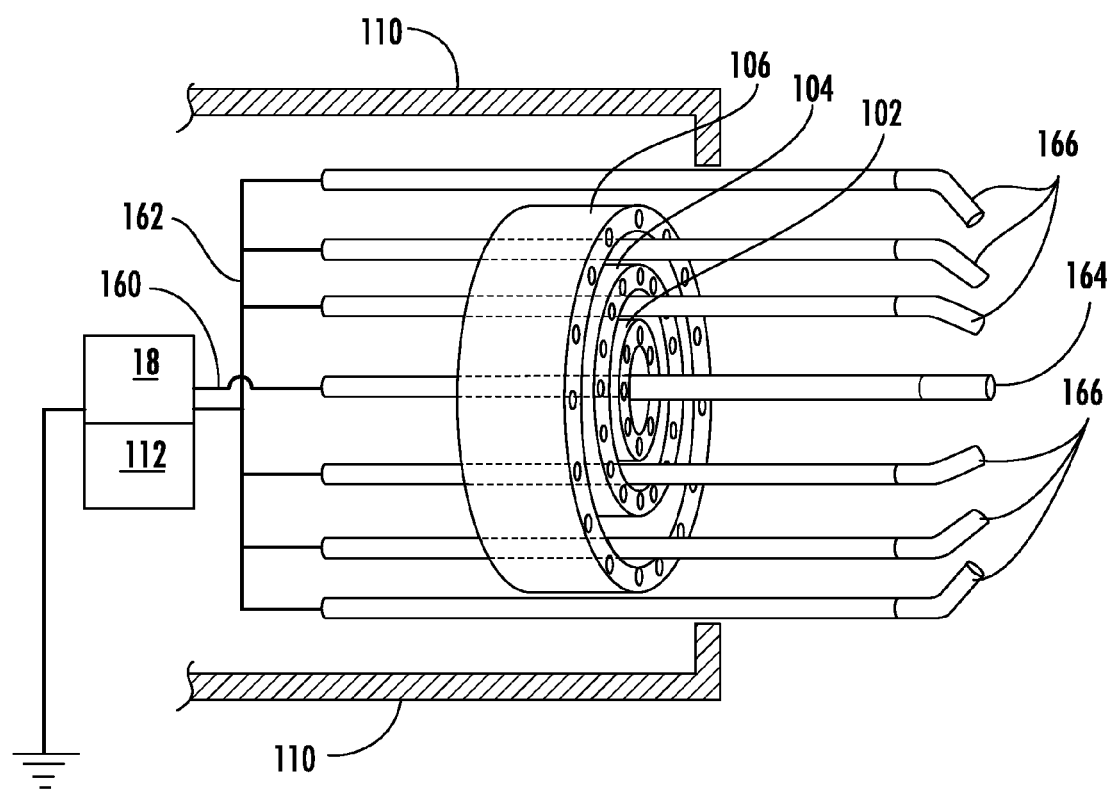
FIG. 7 is a perspective illustration of the wireless conductive channel producing means of FIG. 5 shown in a retracted position.

While the subject apparatus has been described in terms of two concentric channels, a preferred embodiment for sustaining open atmospheric plasma channels and conducting charges for long durations involves a greater number of concentric channels which are collapsing and charging simultaneously. Referring now to FIGS. 5 through 7 as well, an alternate wireless conductive channel producing means and electrode array of a three-channel embodiment of the subject apparatus for wireless transmission of energy is illustrated. In this embodiment, the wireless conductive channel producing means is comprised of first ring 102 supporting at least one ionization beam emitting means 120, a second ring 104 supporting at least one ionization beam emitting means 120, and a third ring 106 supporting at least one ionization beam emitting means 120. Here also, ionization beam emitting means 120 include not only presently known lasers, but also other light sources which will excite ionization in a medium, and each individual ionization beam emitting means 120, also referred to herein as a "nozzle", is capable of independent directional adjustment. First ring 102, second ring 104 and third ring 106 share a common axis of rotation (they are concentric), are capable of independent rotation in either a clockwise or counter clockwise direction as indicated by directional arrows 108. Moreover, first ring 102, second ring 104 and third ring 106 are capable of independent movement along their common axis such that they may each be extended or retracted relative to housing 110. FIG. 6 is a perspective illustration of the wireless conductive channel producing means of FIG. 5 wherein first ring 102, second ring 104 and third ring 106 are shown in an extended position. FIG. 7 is a perspective illustration of the wireless conductive channel producing means of FIG. 5 wherein first ring 102, second ring 104 and third ring 106 are shown in a retracted position within the confines of housing 10 for the reasons described below. Note that some of the electrodes have been eliminated from FIGS. 6 and 7 for ease of illustration only. As should be appreciated, additional rings and corresponding ionization beam emitting means 120 may be added in concentric fashion. As should also now be apparent, the at least three rings and corresponding ionization beam emitting means 120, when activated, are caused to rotate to produce corresponding conductive plasma channels 122,124,126 (not shown in these figures) which share a common axis (i.e., they are concentric). The atmosphere-containing area between each con-channel can be adjusted by changing the direction of each ionization beam emitting means 120. For instance, pointing them away from the axis of rotation of each ring will result in a frustum-shaped channel wall, as opposed to the cylindrically-shaped wall created when the ionization beam emitting means are pointed in a direction parallel with the axis of rotation. An important aspect of the subject invention is maintaining an adequate insulating area of atmosphere around each con-channel wall.

The unique electrode array together with other components described below play an integral role in keeping each con-channel open during energy transmission therethrough. Also referred to herein as "charging rods", each electrode is connected, directly or indirectly to second power source 18 as well as to a control system 112 having, at a minimum: a) one or more processors or computers, and b) memory for processing and/or storing information related to laser control, ring movement, plasma channel generation, feedback and maintenance, and charging and movement of electrodes. As in the above described embodiment, a first electrode 164 is disposed through first ring 102 and extends into the centermost con-channel. At least three electrodes 166 are uniformly distributed outside and adjacent to the perimeter of ring 102, and at least three electrodes 166 are uniformly distributed outside and adjacent to the perimeter of each additional ring 104,106 and so forth. The distal end of each electrode 166 has an unobstructed line of sight to the distal end of first electrode 164, and extends a distance beyond where its corresponding con-channel is initiated. Each electrode or "rod" is capable of independent movement in multiple directions. For example, each rod can be moved such that its distal end is situate exteriorly, interiorly or anywhere within the width of a con-channel wall (i.e., deeper towards the core of the channel wall or more outward towards either outer edge of the wall). The power introduced into each rod is independently variable. Rods 164,166, means for moving rods (not shown), control system 112, magnetic field sensors (not shown) and second power source 18, are all electrically connected and together form the "Debye charging system" component of the subject apparatus.

It is anticipated that the charge flow across each conductive channel will be modulated and shaped by the charging rods for the duration of the charge transfer at the sending location, and in cases where the receiving station is equipped with an apparatus of the subject invention, at both sending and receiving stations. The magnetic field generated by the flow of charged particles across each conductive pathway is monitored at both ends of each current-carrying con-channel and across its full length and this feedback data is then sent to the control system 112 in order to continuously adjust operating variables including but not limited to laser beam direction, frequency, intensity, pulse width and rate, and electrode position and charge.

The Debye charging system permits "shaping" of the charge being transmitted and optimizing stabilization of the current-carrying channel within the variables associated with Debye radius calculations. A set of charging rods is associated with each con-channel and capable of imparting a charge thereto. Each charging rod is movable in multiple directions such that the radius of the charge within the channel can be manipulated and the electromagnetic field associated with the charge re-optimized during the course of energy transmission by maintaining dynamic neutrality between the electromotive force of the transmitted charge and the charged particles that constitute the channel. Moreover, at least one con-channel that neighbors the current-carrying channel can be selectively positively or negatively charged and manipulated by the Debye charging system to influence, stabilize and contain the charge being transmitted in the current-carrying channel. Essentially, the charge being transmitted can be confined within an opposing ion-sheath that will naturally form at or near Debye radius because of the strong attraction of the magnetic field. The magnitude of charge is modulated in order to assist in both initiating and sustaining of the flow of energy through the walls of at least one con-channel. The polarization changes resulting from manipulation of the distance between conduction rods as well as the orientation of the rods relative to the channels also enables shaping of the charge for maximum efficiency. In this way, the conductive channel producing means at both sending and receiving stations, and the strength and shape of the charge at both stations all work together to maximize efficiency.

Figure 8:
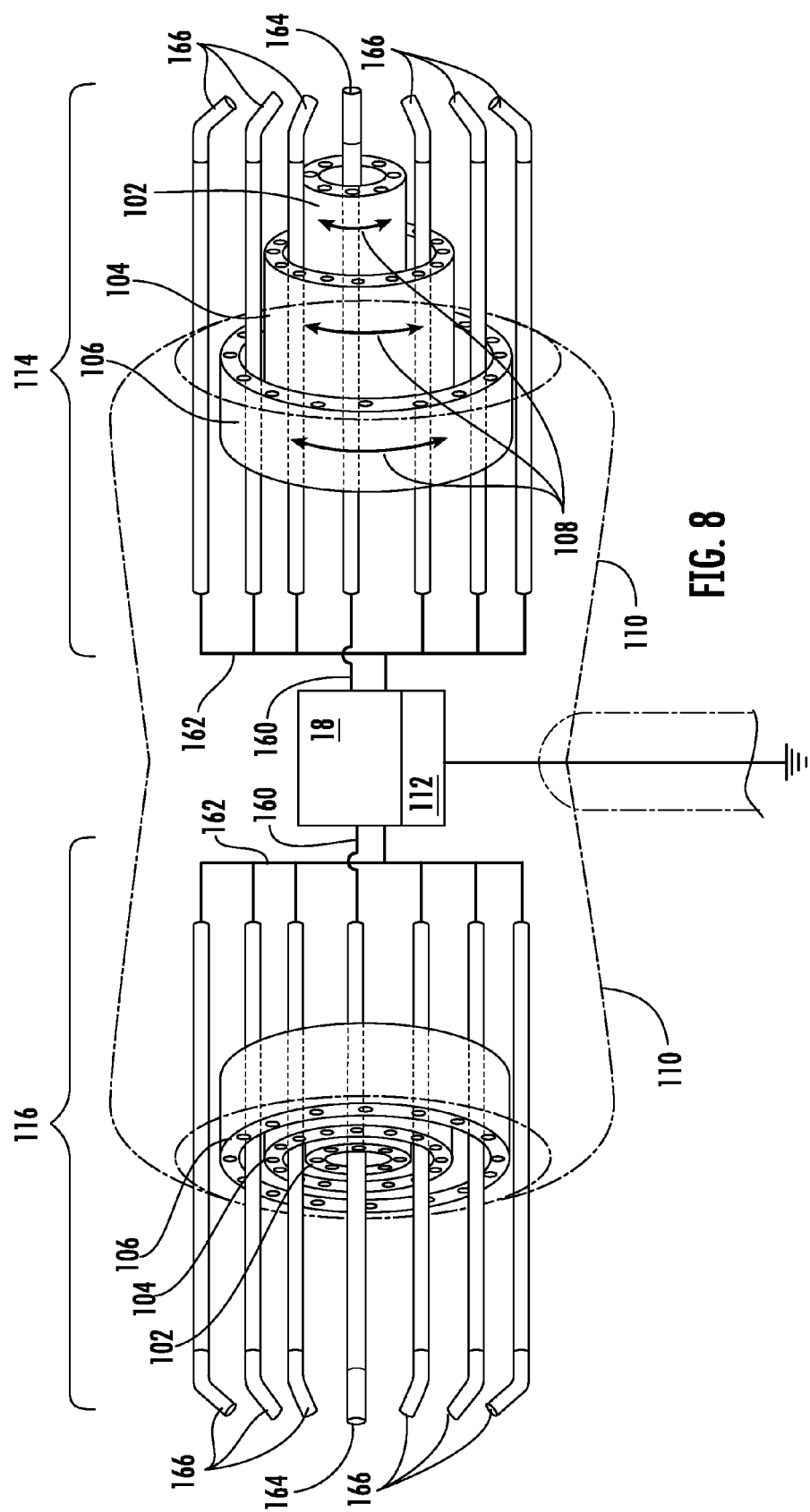
FIG. 8 illustrates a dual sending and receiving embodiment of the subject invention.

FIG. 8 illustrates a dual sending and receiving embodiment of the subject invention (hereinafter "dual unit"). A common housing 110 encloses or partially encloses two oppositely disposed apparatus of the subject invention; one on a sending side 114, the other on the receiving side 116. The terms "sending side" and "receiving side" is somewhat misleading in that any embodiment of the apparatus of the subject invention may be utilized for producing the subject con-channels and for both sending and receiving an electrical charge there through. Each energy transmission apparatus within the dual unit is electrically connected to second power source 18 as well as control system 112, and is grounded. It should be appreciated that "tri-units", "quad-units", and so on are also contemplated for the creation of a wireless energy transmission grid.

As is the case with all embodiments of the apparatus of the subject invention, the dual unit may be mounted atop a tower or other support structure far enough above ground level to assure that adequate insulative non-ionized air exists and is maintained between 25) the outermost con-channel and ground. Moreover, each such apparatus may be mounted on a standard azimuth-elevation mount 68 (FIG. 1) to allow the system to be aimed. Additionally, the entire dual unit may be mounted in a manner that permits multi-directional movement.

Figure 9:
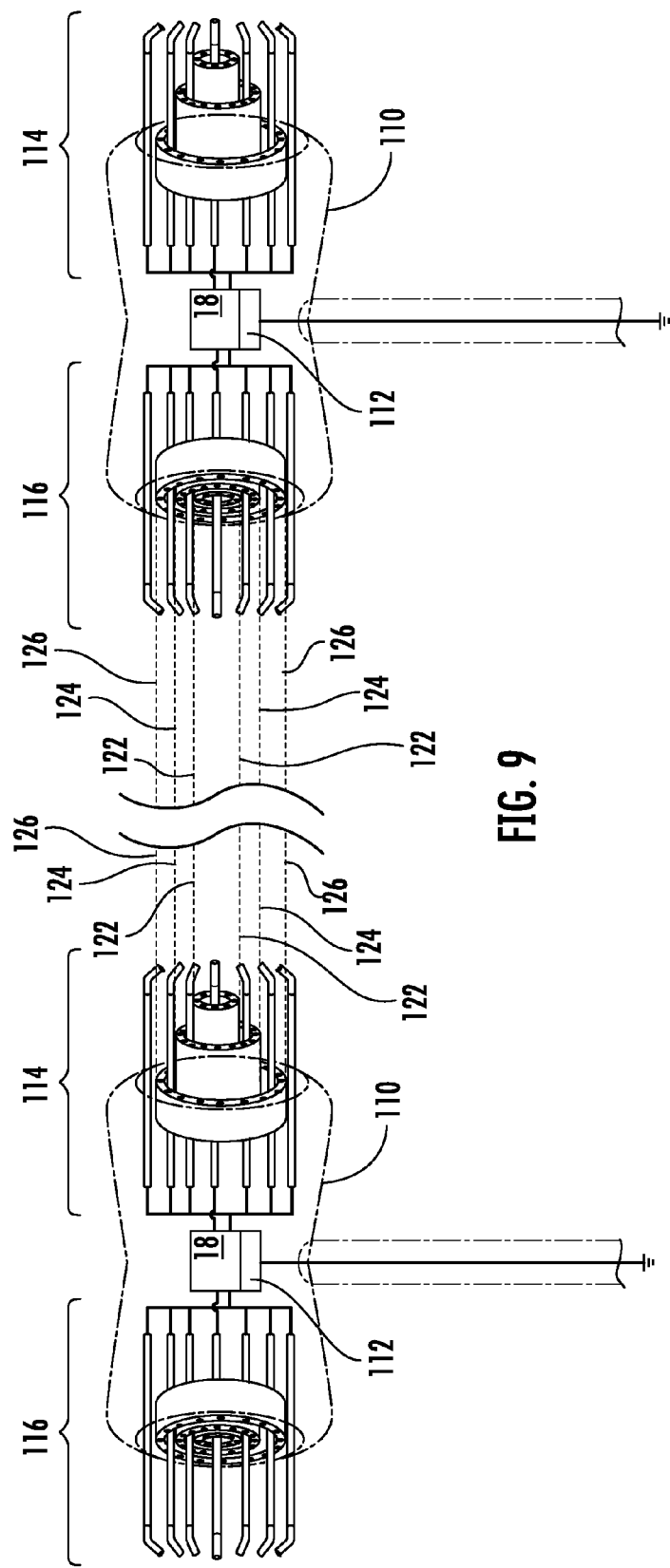
FIG. 9 illustrates a pair of dual sending and receiving stations with three con-channels established there between in point-to-point fashion.

Once mounted, the dual unit may be connected to first energy source 14 (not shown) and second energy source 18, respectively, which are preferably located at ground level. Thusly mounted, the energy transmitting apparatus in the sending side 114 can be aimed at target for the transmission of energy thereto. FIG. 9 illustrates a pair of tower-mounted dual units with three con-channels 122,124,126 established there between in point-to-point fashion. Note that the sending side 114 of the first dual unit (left) has its rings 102,104,106 in an extended position whereas the receiving side 116 of the second dual unit (right) has its rings in a retracted position in order to protect ionization beam emitting means from an energy strike during power transmission. Note further that although the ionization beam emitting means have been retracted into housing 110 on the receiving side, electrodes 164,166 remain fully extended to intercept the incoming flow of electrical energy which is then either routed to the sending side for retransmission, sent to energy storage means at ground level (not shown), or divided for a combination of both, as desired.

Figure 10:
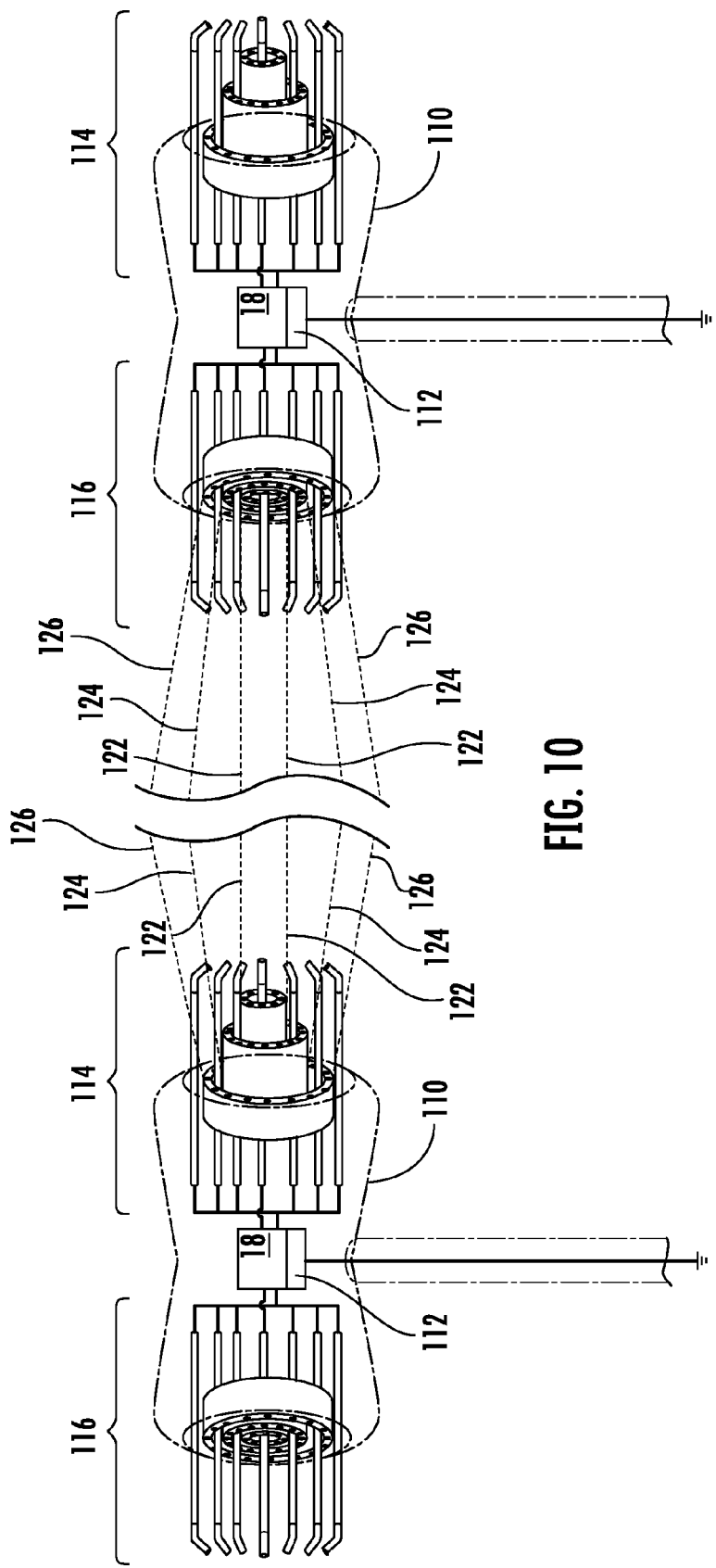
FIG. 10 illustrates how each of the three con-channels of FIG. 10 can be manipulated to take on different shapes through adjustment of the direction and focal point of each ionizing beam emitting means.

Referring to FIG. 10, in another embodiment, a charge is initiated in one or more charging rods 164,166 on the receiving side 114 of the receiving station. The charge is capable of attracting the energy to be transmitted from the sending station. Such a mechanism emulates the natural phenomenon of a lightning strike. Charge accumulates in a cloud (the transmitting station) which induces an opposite charge in the ground (the receiving station). Step leaders emanate from the cloud reaching out to the ground, traveling not by the shortest route, but by the path of least resistance. Streamers from ground reach up to meet the leaders and induce the negative cloud charge to ground. In the subject embodiment, the ground charge is artificially created in the receiving station rather than induced, and the energy travels from the transmission station to the receiving station along the predefined conductive path rather than randomly through the atmosphere. Note that once the con-channels 122,124,126,etc. have been established, they may be manipulated to provide greater or lesser distance between them by directional adjustment of their corresponding ionization beam emitting means.

Figure 11:
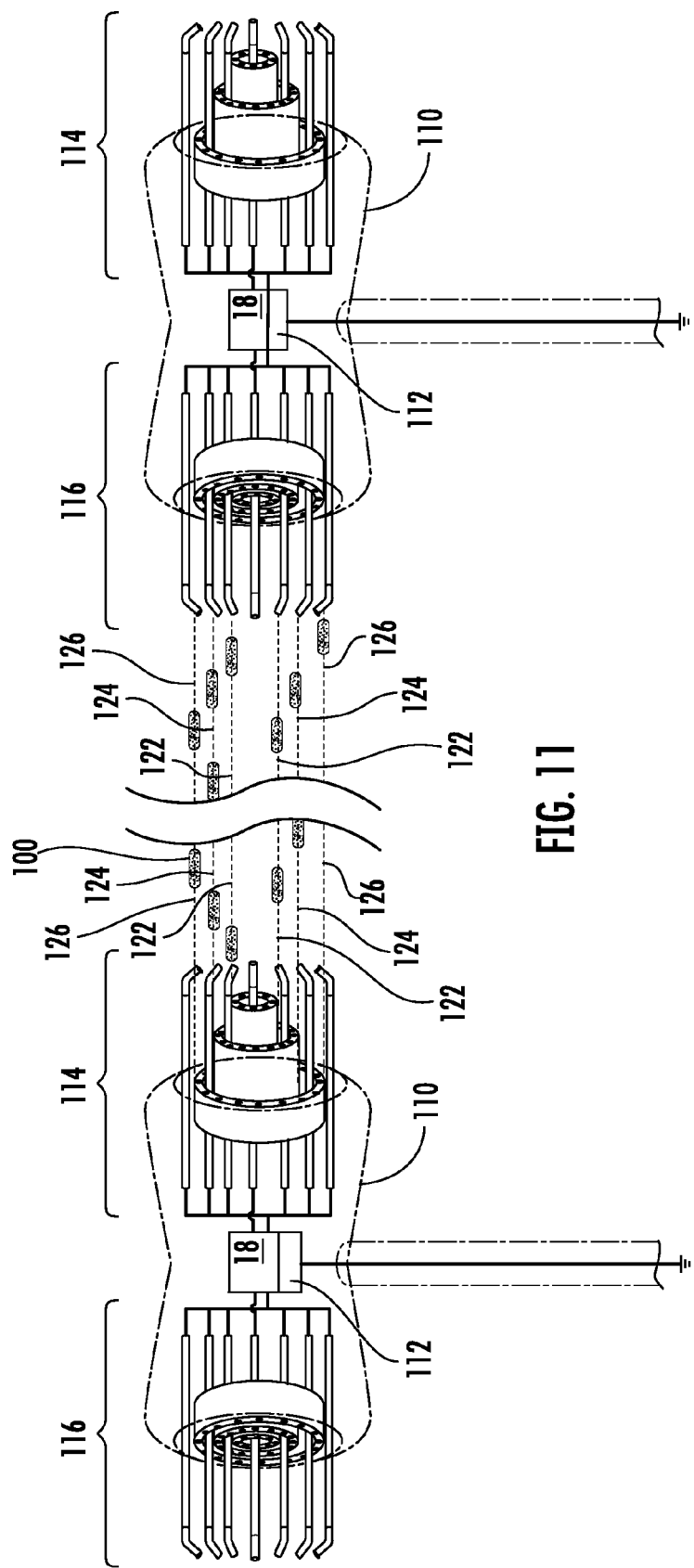
FIG. 11 illustrates a charge being transmitted between sending and receiving stations without the benefit of the Debye charging system of the subject invention.
Figure 12:
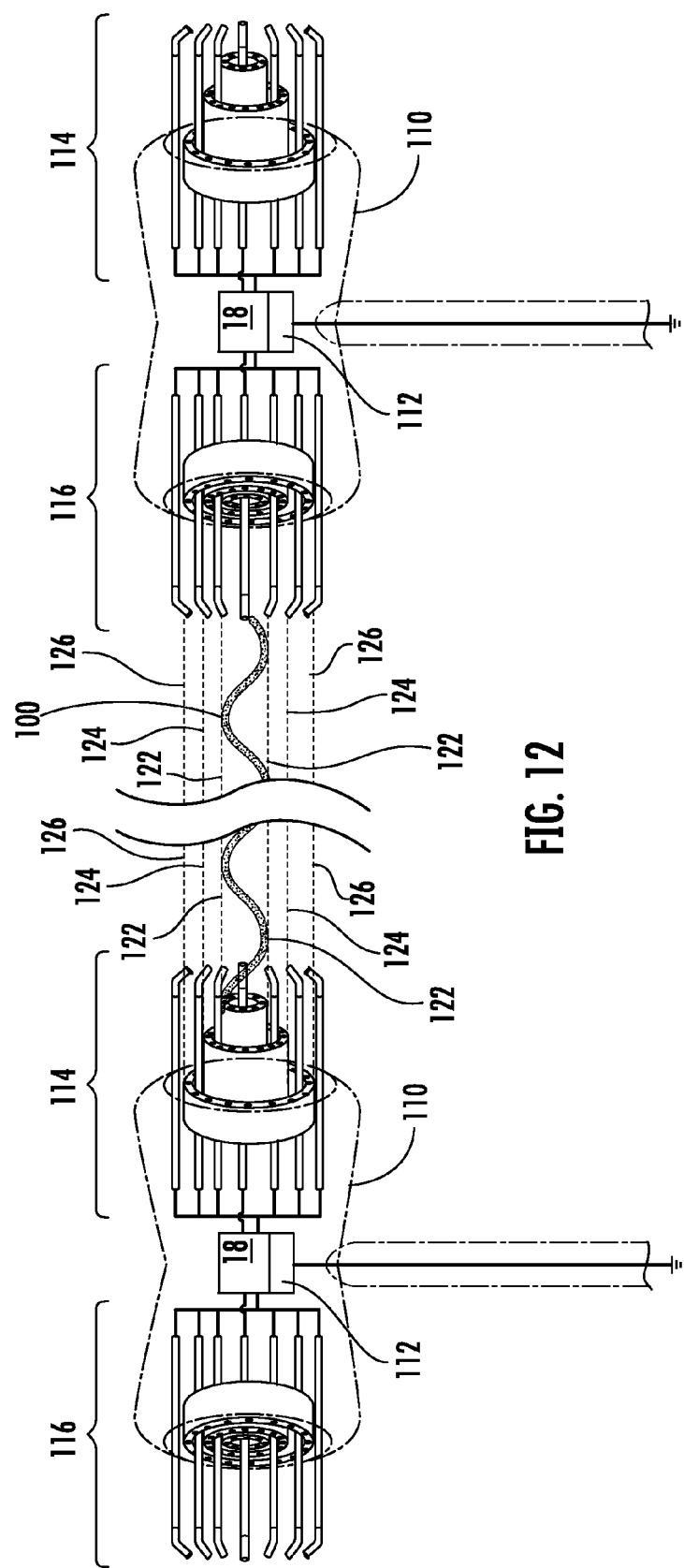
FIG. 12 illustrates a charge being transmitted between sending and receiving stations with the benefit of the Debye charging system of the subject invention.

To summarize the method of this embodiment, the flow of energy through a con-channel is initiated by the receiving station which sends an induction leader into the ionized channel. The induction leader can be less than the dielectric breakdown potential, because the potential gradient inside of the channel will induce a return stroke to the receiving station once a high order charge is propagating from the sending station. The sending station introduces a charge above the dielectric breakdown criteria for co-channel conditions, and the charge is induced to the receiving station through the concentric ionized channels which are maintained through the cooperative integrated magnetic field manipulation of both the sending and receiving stations. While transfers of 40 kilo amps to 120 kilo amps and 5 to 350 coulombs are possible, it would be difficult to control both the heat and the field collapse at those strengths. The heat can cause ambient ionization outside of the channel blowing it out, while electron spin can produce a magnetic collapse of the charge. The concentric channels have to balance these factors in order to sustain current through the channel for much longer duration than would occur naturally, which is about 30 micro seconds for an average lightning bolt. FIG. 11 illustrates a charge being transmitted between sending and receiving stations without the benefit of the Debye charging system of the subject invention. Each charge-carrying channel is more likely to destabilize and collapse, but because of the redundancy of the con-channel configuration there is always a neighboring open channel onto which an errant charge can jump. FIG. 12 illustrates a charge being transmitted between sending and receiving stations with the benefit of the Debye charging system of the subject invention being employed. The current-carrying channel, in this case con-channel 122, will remain open for a longer period of time due to the influence of the electromagnetic field imposed by the Debye charging system on the neighboring con-channel 124 which stabilize the double layers formed in the current-carrying channel 122. When combined with directional manipulation of the charging rods 166 across the charge, the shape and stability of the transmitted charge is controlled for more efficient power transmission.

In order to keep enough insulating non-ionized atmosphere between the charged channels and the Earth, another embodiment of the subject invention further includes a second plasma channel producing means located at the receiving station for producing a complimentary set of at least one conductive plasma channels in cooperative engagement with the first set of at least one conductive plasma channels generated at the transmitting station. The plasma channel producing means at both the sending and receiving stations may be aimed upwardly (not shown) at an angle above the curve of the Earth such that the channels created by each intersect at a greater distance above ground than would occur if they were transmitted along the same axis. Such adjustments of the channel paths above the Earth's surface may be implemented to maintain a desired distance between the conductive path and ground and, therefore, a relatively uniform volume of insulating non-ionized atmosphere therebetween.

While AC current transfer within the described channel technology may be employed, it is expected that high voltage DC will be most conducive and natural to the manufactured conditions that simulate lightning. It is further expected that the power oscillations of the DC current will resemble magnetic roping of the AC current when properly manipulated for maximum efficiency.

Also, it is more desirable to have a sustainable long duration charge transfer, than to have a maximum short duration charge under most conditions. Circumstances may prefer one over the over. Premature grounding, channel collapse and heating are considerations to balance with cost and efficiency.

As should now be appreciated, all embodiments of the subject apparatus serve as a means for transmitting high order energy from distant energy sources through the atmosphere and into a load center for further distribution using conventional transmission lines and/or additional apparatus of the subject invention in point-to-point or grid-like fashion.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

What is claimed as being new, useful and desired to be protected by Letters Patent of the United States is as follows:

1. An apparatus for the wireless transmission of energy through the atmosphere, comprising:
   a. a first pulsed ionizing beam emitting means for producing a first pulsed ionizing beam through the atmosphere;
   b. a second pulsed ionizing beam emitting means for producing a second pulsed ionizing beam through the atmosphere;
   c. means for rotating said first pulsed ionizing beam to form a first conductive channel comprised of a wall of partially ionized atmosphere; said first conductive channel having a substantially ring-shaped cross section; said ring having a diameter;
   d. means for rotating said second pulsed ionizing beam to form a second conductive channel comprised of a wall of partially ionized atmosphere; said second conductive channel having a substantially ring-shaped cross section; said ring having a diameter greater than said diameter of said first conductive channel; said first conductive channel and said second conductive channel being concentric and being separated by a distance therebetween;
   e. an energy source capable of outputting a flow of electrically charged particles; and
   f. means for introducing said flow of electrically charged particles into said wall of either said first conductive channel, said second conductive channel, or both; whereby said walls of said first conductive channel and said second conductive channel provide concentric pathways for the transmission of said electrically charged particles.

2. An apparatus for the wireless transmission of energy through the atmosphere, comprising:
   a. at least two pulsed ionizing beam emitting means each for producing a separate pulsed ionizing beam through the atmosphere;
   b. means for rotating each of said pulsed ionizing beams such that each pulsed ionizing beam forms a separate conductive channel comprised of a wall of partially ionized atmosphere; each said conductive channel being concentric and being separated by a distance therebetween;
   c. an energy source capable of outputting a flow of electrically charged particles; and
   d. means for introducing said flow of electrically charged particles into said wall of at least one of said conductive channels; whereby said wall of each said conductive channel provides a pathway for the transmission of said electrically charged particles.

3. The apparatus for wireless transmission of energy of claim 1, further including a target to which said first pulsed ionizing beam and said second pulsed ionizing beam are directed; said target including means for inducing to said target said flow of electrically charged particles introduced into said wall of said first and/or said second conductive channel.

4. The apparatus for wireless transmission of energy of claim 2, further including a target to which said at least two pulsed ionizing beams are directed; said target including means for inducing to said target said flow of electrically charged particles introduced into said wall of said at least one conductive channels.

5. The apparatus for wireless transmission of energy of claim 1, further including a target to which said first pulsed ionizing beam and said second pulsed ionizing beam are directed; said target including means for receiving and/or storing said electrically charged particles transmitted thereto via said first conductive channel and/or said second conductive channel.

6. The apparatus for wireless transmission of energy of claim 2, further including a target to which said at least two pulsed ionizing beams are directed; said target including means for receiving and/or storing said electrically charged particles transmitted thereto via said at least two conductive channels.

7. The apparatus for wireless transmission of energy of claim 3, wherein said target further includes means for receiving and storing said electrically charged particles transmitted thereto via said first conductive channel and/or said second conductive channel.

8. The apparatus for wireless transmission of energy 4, wherein said target further includes means for receiving and storing said electrically charged particles transmitted thereto via said first conductive channel and/or said second conductive channel.

9. The apparatus for wireless transmission of energy of claim 1, further including a first charging rod partially extending into an area within an interior of said walls of said first conductive channel and said second conductive channel; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

10. The apparatus for wireless transmission of energy of claim 2, further including an area within an interior of said wall of the centermost conductive channel; a first charging rod partially extending into said area; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

11. The apparatus for wireless transmission of energy of claim 3, further including a first charging rod partially extending into an area within an interior of said walls of said first conductive channel and said second conductive channel; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

12. The apparatus for wireless transmission of energy of claim 4, further including an area within an interior of said wall of the centermost conductive channel; a first charging rod partially extending into said area; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

13. The apparatus for wireless transmission of energy of claim 5, further including a first charging rod partially extending into an area within an interior of said walls of said first conductive channel and said second conductive channel; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

14. The apparatus for wireless transmission of energy of claim 6, further including an area within an interior of said wall of the centermost conductive channel; a first charging rod partially extending into said area; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

15. The apparatus for wireless transmission of energy of claim 7, further including a first charging rod partially extending into an area within an interior of said walls of said first conductive channel and said second conductive channel; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

16. The apparatus for wireless transmission of energy of claim 8, further including an area within an interior of said wall of the centermost conductive channel; a first charging rod partially extending into said area; and at least three additional charging rods uniformly distributed around and adjacent to the outer perimeter of said wall of each said conductive channel; said at least three additional charging rods being selectively positively charged or negatively charged; each of said at least three additional charging rods having a channel wall engaging portion; whereby said channel wall engaging portion of each said at least three additional charging rods is capable of independent movement across the wall of a charge-carrying channel such that the radius of the charge within the channel can be manipulated and the electromagnetic field associated with the charge re-optimized during the course of energy transmission by maintaining dynamic neutrality between the electromotive force of the transmitted charge and the charged particles that constitute the channel.

17. A method of wireless transmission of energy through the atmosphere, the method comprising the steps of:
  a. producing a first pulsed ionizing beam through the atmosphere using a first pulsed ionizing beam emitting means;
  b. producing at least one additional pulsed ionizing beam through the atmosphere using a corresponding at least one additional pulsed ionizing beam emitting means;
  c. causing said first pulsed ionizing beam to rotate to form a first conductive channel comprised of a wall of partially ionized atmosphere; said first conductive channel having an essentially ring-shaped cross section; said ring having a diameter;
  d. causing said at least one additional pulsed ionizing beam to rotate to form a corresponding additional conductive channel comprised of a wall of partially ionized atmosphere; said first conductive channel and said at least one additional conductive channel being concentric and each having a different diameter; and
  e. introducing a flow of charged particles into said wall of either said first conductive channel or said wall of said at least one additional conductive channel.

18. The method of transmitting energy through the atmosphere of claim 17, further including the step of inducing said charged particles across said first conductive channel and/or said at least one additional conductive channel, or both, to a target.

19. The method of transmitting energy through the atmosphere of claim 17, wherein at least one of said first conductive channel and said at least one additional conductive channel is open at all times during the transmission of said charged particles.

20. The method of transmitting energy through the atmosphere of claim 18, wherein at least one of said first conductive channel and said at least one additional conductive channel is open at all times during the transmission of said charged particles.

21. An apparatus for the wireless transmission of energy through a gas medium, comprising:
   a first ionizing beam emitter, wherein the first ionizing beam emitter produces a first ionizing beam through a gas medium;
   a second ionizing beam emitter, wherein the second ionizing beam emitter produces a second ionizing beam through the gas medium;
   wherein the first ionizing beam is moved to form a first conductive channel, wherein the first conductive channel comprises a first wall of partially ionized gas medium;
   wherein the second ionizing beam is moved to form a second conductive channel, wherein the second conductive channel comprises a second wall of partially ionized gas medium; wherein the first conductive channel and the second conductive channel are concentric and separated by a distance therebetween;
   an energy source, wherein the energy source produces electrically charged particles;
   a charge introducer, wherein the charge introducer introduces the electrically charged particles into the first wall of partially ionized gas medium; and
   a target to which the first ionizing beam is directed, wherein the electrically charged particles introduced into the first wall of partially ionized gas medium flow to the target.

22. The apparatus according to claim 21, wherein the target comprises a receiver and a storage element, wherein the receiver receives the electrically charged particles introduced into the first wall of partially ionized gas medium that flow to the target, wherein the storage element stores the electrically charged particles received by the receiver.

* * * * *

UNITED STATES PATENT AND TRADEMARK OFFICE
CERTIFICATE OF CORRECTION

| | |
|---|---|
| PATENT NO. | : 8,772,974 B2 |
| APPLICATION NO. | : 12/917009 |
| DATED | : July 8, 2014 |
| INVENTOR(S) | : Glenn E. Lane |

It is certified that error appears in the above-identified patent and that said Letters Patent is hereby corrected as shown below:

In the Specification,

Column 13,
Line 14, "between 25) the outermost" should read --between the outermost--.

Signed and Sealed this
Twenty-first Day of July, 2015

Michelle K. Lee
*Director of the United States Patent and Trademark Office*